United States Patent
Beecroft

(10) Patent No.: US 9,729,450 B2
(45) Date of Patent: *Aug. 8, 2017

(54) METHOD OF DATA DELIVERY ACROSS A NETWORK

(71) Applicant: Cray UK Limited, Reading (GB)

(72) Inventor: Jon Beecroft, Bristol (GB)

(73) Assignee: Cray UK Limited, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,347

(22) Filed: Dec. 5, 2014

(65) Prior Publication Data

US 2016/0142318 A1    May 19, 2016

Related U.S. Application Data

(62) Division of application No. 12/997,604, filed as application No. PCT/GB2009/001574 on Jun. 23, 2009, now Pat. No. 8,908,529.

(30) Foreign Application Priority Data

Jun. 27, 2008 (GB) .................................. 0811813.5

(51) Int. Cl.
*H04L 12/803* (2013.01)
*H04L 12/875* (2013.01)
(Continued)

(52) U.S. Cl.
CPC .......... *H04L 47/122* (2013.01); *H04L 45/125* (2013.01); *H04L 45/22* (2013.01);
(Continued)

(58) Field of Classification Search
CPC ..... H04L 45/125; H04L 45/22; H04L 49/101; H04L 49/1515; H04L 49/253
(Continued)

(56) References Cited

U.S. PATENT DOCUMENTS 8,385,208 B1 *  2/2013  Medina ................. H04L 49/351
                                                 370/236
8,908,529 B2 * 12/2014  Beecroft ............... H04L 45/125
                                                 370/217
(Continued)

FOREIGN PATENT DOCUMENTS

EP    1005745 A1   6/2000
GB    2404826 A    2/2005
GB    2459838 A    11/2009

*Primary Examiner* — Andrew Lai
*Assistant Examiner* — Albert Shih
(74) *Attorney, Agent, or Firm* — Craig J. Lervick; Larkin Hoffman Daly & Lindgren, Ltd.

(57) ABSTRACT

The present invention relates to a method of managing congestion in a multi-path network, the network having a plurality of network elements arranged in a plurality of switch stages and a plurality of network links interconnecting the network elements, the method comprising the steps of detecting congestion on a network link, the congested network link interconnecting the output port of a first network element with a first input port of a second network element in a subsequent switch stage; identifying an uncongested network link connected to a second input port of said second network element; and directing future data packets on a route across the multi-path network which includes the identified uncongested network link. Also provided is a multi-path network and an Ethernet bridge or router incorporating such a multi-path network.

54 Claims, 8 Drawing Sheets

(51) Int. Cl.

| | |
|---|---|
| *H04L 12/833* | (2013.01) |
| *H04L 12/707* | (2013.01) |
| *H04L 12/801* | (2013.01) |
| *H04L 12/729* | (2013.01) |
| H04L 12/933 | (2013.01) |
| H04L 12/937 | (2013.01) |
| H04L 12/935 | (2013.01) |
| H04L 12/931 | (2013.01) |

(52) U.S. Cl.
CPC .............. *H04L 45/24* (2013.01); *H04L 47/11* (2013.01); *H04L 47/31* (2013.01); *H04L 47/56* (2013.01); *H04L 49/501* (2013.01); *H04L 49/101* (2013.01); *H04L 49/1515* (2013.01); *H04L 49/253* (2013.01); *H04L 49/3018* (2013.01); *H04L 49/3045* (2013.01); *H04L 49/351* (2013.01); *H04L 49/505* (2013.01); *H04L 49/506* (2013.01)

(58) Field of Classification Search
USPC ....................................................... 370/237
See application file for complete search history.

(56) References Cited

U.S. PATENT DOCUMENTS

| | | | |
|---|---|---|---|
| 2002/0176363 A1* | 11/2002 | Durinovic-Johri | ..... H04L 45/00 370/237 |
| 2003/0058880 A1 | 3/2003 | Sarkinen et al. | |
| 2005/0002334 A1 | 1/2005 | Chao et al. | |
| 2005/0270974 A1 | 12/2005 | Mayhew | |

\* cited by examiner

METHOD OF DATA DELIVERY ACROSS A NETWORK

CROSS REFERENCE TO RELATED APPLICATIONS

The present application is a divisional of U.S. patent application Ser. No. 12/997,604, filed Jun. 23, 2009, now U.S. Pat. No. 8,908,529.

BACKGROUND

Technical Field of the Invention

The present invention generally relates to a method of data delivery across a network and in particular to a method of minimising the effects of congestion in multi-path networks and to a multi-path network implementing the method. The method and multi-path network are suitable for use in, but not limited to, multi-processor networks such as storage networks, data centres and high performance computing. In particular, the present invention is suited for use in bridges, switches, routers, hubs and similar devices including Ethernet devices adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article that describes in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
3. Network Layer is responsible for network-wide communication, routing packets over the network between end-stations. It must accommodate multiple Data Link technologies and topologies using a variety of protocols, the most common being the Internet Protocol (IP).
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

For the purposes of this document we need not consider operations above the Transport Layer as the method described herein should, if well implemented, shield higher layers from issues arising in and below its scope.

Network Interconnections

A device that implements network services at the Data Link Layer and above is called a station. The Physical Layer is excluded from this definition as it is not addressable by a protocol. There are two types of station:

1. End Stations are the ultimate source and destination of network data communication across the network.
2. Intermediate Stations forward network data generated by end stations between source and destination.

An intermediate station which forwards completely at the Data Link Layer is commonly called a Bridge; a station which forwards at the Network Layer is commonly called a Router.

Network stations attached to an Ethernet network exchange data in short sequences of bytes called packets or Protocol Data Units (PDU). PDUs consist of a header describing the PDUs destination and a body containing the payload data. In the OSI model the PDU has a distinct name at each protocol layer. A Physical Layer PDU is called a stream, at the Data Link Layer the PDU is a frame, at the Network Layer the PDU is a packet and at the Transport Layer the PDU is called a segment or message.

PDUs are encapsulated before being transmitted over the physical Ethernet hardware. Each encapsulation contains information for a particular OSI Layer, the Ethernet stream encapsulates a frame which in turn encapsulates a packet which encapsulates a message and so on. This encapsulation, containing headers and payload, is finally transmitted over the network fabric and routed to the destination.

At the Transport Layer, an associated standard, the Transmission Control Protocol (TCP), in addition to providing a simplified interface to applications by hiding the underlying PDU structure, is responsible for rearranging out-of-order PDUs and retransmitting lost data. TCP has been devised to be a reliable data stream delivery service; as such it is optimised for accurate data delivery rather than performance. TCP can often suffer from relatively long delays while waiting for out-of-order PDUs and data retransmission in extreme cases, reducing overall application performance and making it unsuitable for use where a maximum PDU transmission delay (jitter) needs to be guaranteed, in-file systems or media delivery, for example. Furthermore, at the lowest layer of the TCP/IP hierarchy, in the network access layer where PDUs are transmitted over the network, a fully compliant IEEE 802.1D standard MAC bridge joining separate networks together requires that order is preserved for source and destination pairs. PDU duplication is another cause of reduced performance in Ethernet networks. A unicast PDU whose destination route has not been learned by a network bridge will be flooded out to all routes from the bridge and will be buffered on multiple outbound ports at the same time. Network reconfiguration affecting the preferred route from a bridge to the destination can cause a duplicate PDU to be sent from a buffer after a duplicate PDU has already been sent out of the previous preferred route, both arriving at the destination. Again, the higher level TCP protocol will handle this but not without degrading overall performance.

Disordering and duplication should not occur during normal operation. These features of multi-path Ethernet networks are constrained by the Rapid Spanning Tree Protocol (RSTP) as defined by the IEEE 802.1D standard. The RSTP maintains a preferred route between bridges by disabling alternative routes, removing multiple paths and loops, leaving a single path that ensures in-order frame delivery.

A RSPT enforced, single path Ethernet network, often referred to as Static Routing, performs well under light network traffic load and for symmetric network traffic patterns. However it starts to fail as the network traffic load increases and the number of network connected devices increase in number and performance. This is particularly the case where communications between sources and destinations are not well ordered spatially. Many PDUs being sent concurrently across the network for different destinations will have to use the same route within the network. For some network patterns this can be particularly unfortunate for the performance of the system as a whole due to the saturation of this single route and the congestion it ultimately suffers from.

Some of the internal links of the network will remain unused whilst others will be required to transport more than one connection, slowing down the PDUs considerably. Thus, static routes on random traffic patterns not only reduce the total network bandwidth, they can leave some egress ports starved of nearly all output bandwidth while others egress ports are relatively unaffected. If the network is supporting a single large application then this can have the effect of slowing the application performance down to the rate of the slowest egress port.

As an alternative to static routing, networks may also employ so called Adaptive Routing, which allows more of the possible paths across the network to be used and theoretically improving the total bandwidth when all the ports into the network are busy taking data. However, adaptive routing still has problems; it does not necessarily find all the unused links. It will be likely to find all the links in the early stages of the network where choosing any link is taking the PDUs closer to the destination. However later stages, closer to the destination, are still probably going to find collisions between different PDUs. This is because the PDUs usually do not have an alternative route as the data nears the destination and must choose a specific link in order to reach the destination. To make the problem worse it is a requirement of most networks that all the PDUs must arrive in the original order they were sent. Adaptive routing opens up the possibility of one PDU overtaking another, misordering the data or causing duplication.

With the expansion of Ethernet networks, congestion has become a major issue, increasingly impacting networks and preventing many from ever reaching their designed performance goals. The network becomes clogged with data as an ever-increasing number of users, applications and storage devices exchange information. Congestion causes extreme degradation of data centre servers, resulting in under-utilisation of a company's expensive computing resources, often by as much as 50%. This condition will get much worse as networks get faster, with more connected devices distributed over larger geographical areas. The result will be even more wasted resource, time, money and opportunity.

Congestion can arise at any point in a multi-path network when data from more than one intermediate station converges on a single link for onward transmission. This style of communication is common in HPC and data center applications running on server clusters, it is also present when applications use network attached storage. In this latter context congestion also introduces another recognised issue, that of jitter in which the message delivery period becomes unpredictable. Congestion is an application performance killer; in a simple network delay and jitter prevent a system reaching peak performance levels. In complex networks, congestion can also necessitate the lengthier retransmission of data because intermediate stations between the endpoints simply discard or drop blocked traffic, reducing performance further. In practice, congestion spreads from the originating hot-spot until it backs up over the entire network resulting in un-associated routes being affected by a point of congestion in another part of the network. This is illustrated in the simple network diagram of FIG. 1.

FIG. 1 illustrates schematically a simplified conventional network. The rectangles on the left and right represent ingress and egress ports 2 respectively. The circles represent network crossbars 1 and the lines represent the interconnecting links, over which PDUs will traverse the network. In this example each network crossbar 1 has only three input ports and three output ports 2. Typically network crossbars have many more ports than this and this mechanism works equally well with higher arity crossbars. An example of a conventional network crossbar 1 is illustrated in FIG. 2.

It can be seen In FIG. 1 that the total available bandwidth remains constant across the network; there being nine links available for transporting data at all stages across the network. As can be seen, the network of FIG. 1 has three stages of switching. Two stages of switching would be the minimum to complete a path from any ingress port to any egress port using the network crossbars 1. However this would result in poor performance for some traffic patterns. For example, if ingress port A was transmitting to egress port R while port B was sending to port S and port C was sending to port T then all three traffic flows would have to share a single link.

When a third stage of switching is added, for a random set of connections from the ingress ports to the egress ports, now a set of routes become available enabling all the connections to operate at full bandwidth. The problem is working out the non-contending set of routes required to make this possible. In the illustrated example, a simple approach would be to choose a random route out of the first switching stage that was on a link not being used by another traffic flow. This form of adaptive routing usually improves the expected total throughput for a saturated network traffic pattern but it is not controlled and could still easily result in some idle links and some over committed links between the second and third stages of switching.

Adaptive routing is effective if the traffic pattern is continually changing. Even if the initial adaptive guess is wrong, provided the network crossbars have a reasonable amount of buffering, the next adaptive choice of output is likely to be better. The continually changing output choice is going to provide new data to fill the under-utilised links and temporary output blocking can be held in the input buffers of the network crossbars until the network traffic pattern changes to allow it to proceed.

Adaptive routing is less good at coping with a random set of communications that remain busy but unchanging for a long period. Here the initial guess is critical to the final total bandwidth of the network. If the initial guess is wrong then all the data could be serialized along only 3 of the 9 possible links delivering only ⅓ of the total network bandwidth. If the network has higher arity crossbars the problem can be much worse. If the crossbars have an arity of 64 then it can be as bad as only delivering 1/64 of the total network bandwidth. It is very common for network traffic patterns to be random in their connections but remain constant in the flow of data. For example a TCP/IP stream established between a client and server providing a full duplex data connection can have a very high bandwidth requirement that might be sustained for a long duration. The data stream is split into many separate PDUs, and these are sent one after another from the same ingress to egress ports of the network. Another example is an RDMA stream. A large block of data, perhaps hundreds of megabytes, is sent from one ingress port to another egress port again split into many separate PDUs.

When a network becomes congested, blocked traffic is simply thrown away by the switches in an attempt to reduce the immediate network load, hoping that the congested point will eventually clear. The TCP/IP layer in the sending device will retransmit the data after a timeout. This is disastrous for system performance, at best it greatly increases latency and significantly reduces throughput. If the congestion does not clear quickly an entire network can completely collapse and become incapable of transmitting any traffic.

Congestion will get much worse as networks continue to become larger, faster and denser, with more connected end stations distributed over larger geographical areas. Removing congestion or at least minimising the effects of congestion allows full, sustained use of data center services enabling companies to operate more efficiently and cost effectively.

With the move to 10 Gb Ethernet, devices will connect to the network at the same speed as the interconnecting fabric. This, in turn, will remove the extra network capacity that up until now has helped reduce congestion in previous network generations.

Many higher-level protocols have been devised to try to remove the effects of congestion. They all rely on trying to control the total output bandwidth of the sources sending data into the network with the intention of bringing the input bandwidth close to but not exceeding the congestion threshold. Intermediate network stations achieve this by data flow classification and upstream notification. The inspection of the data flow and subsequent messaging to rate limit the source all takes time, adding latency and complexity. All attempt to manage congestion rather than attempting to prevent it in the first place.

To date none of the congestion management techniques are particularly successful and all ultimately rely on preventing a network from ever achieving sustained peak levels of operation. Localised endpoint congestion may occur before the steady state conditions these techniques rely on have been established and some traffic patterns are inherently so unstable with rapidly changing conditions that the traffic management algorithms are never given a chance to stabilise.

The problem with all congestion management techniques is that congestion has to be occurring before remedial action can be taken. Management at this point can benefit if the network traffic is of a single type and the data rate is constant and predictable, however the benefit is often reduced in the more complex environment of the data center where services run more diverse applications with dynamically changing data flows. In high performance networks, congestion hotspots appear rapidly and move around the network at an incredible rate. This increases the probability of over-constraining the wrong part of the network, as the point of congestion may have moved by the time notification and subsequent action have been applied.

Once congestion is identified by a management technique, data is restricted or rate-limited at the source, preventing saturation. This limits the overall systems capabilities, preventing a service from running at sustained peak performance for fear of causing congestion.

Description of Related Art

In US 2007/0064716 a method of controlling data unit handling is described in which congestion management measures may be selectively disabled.

However, this offers no benefits in terms of preventing congestion and may indeed add to congestion problems.

In US 2006/0203730 a method of reducing end station latency in response to network congestion is described. This document proposes that in response to a congestion indicator, the introduction of new frames to a queue is prevented i.e. frames are dropped. However, as mentioned earlier this has the disadvantage that where the dropped frames form part of a large group of frames being communicated across the network, in order to ensure the frames arrive at their end station in the correct order, duplicate copies of the frames must be issued.

The present invention seeks to overcome the problems encountered with conventional networks and in particular seeks to provide a method of minimising the effects of congestion in a multi-path network and of with improving the bandwidth of the network.

SUMMARY OF THE INVENTION

The present invention provides a method of managing congestion in a multi-path network, the network having a plurality of network elements arranged in a plurality of switch stages and a plurality of network links interconnecting the network elements, the method comprising the steps of:
  detecting congestion on a network link, the congested network link interconnecting the output port of a first network element with a first input port of a second network element in a subsequent switch stage;
  identifying an uncongested network link connected to a second input port of said second network element; and
  directing future data packets on a route across the multi-path network which includes the identified uncongested network link.

In a preferred embodiment each network element has a plurality of input ports and each input port has associated therewith at least one data packet buffer, whereby the step of detecting congestion including monitoring the content of the data packet buffers of the first network element so that congestion is detected when the content of a data packet buffer exceeds a predetermined threshold. Ideally, the content of the data packet buffers is monitored by monitoring the depth of the buffers.

When the content of a data packet buffer exceeds the predetermined threshold, preferably the congested network link is the network link on which the next data packet to be output from that data packet buffer is intended to be transmitted.

With the preferred embodiment the method further includes the step of communicating the detection of congestion from the first network element to the second network element. Ideally, when congestion is detected, a congestion tag is attached to the header of the next data packet intended for transmission on the congested network link.

Preferably, in response to receipt by the second network element of one or more data packets each with a congestion tag in its header, the method includes the step of selecting a data packet having a congestion tag in its header and issuing to a third network element in a switch stage preceding the switch stage of the first network element a first control token to prevent the transmission by the third network element of further data packets having the same ordering requirement as the data packet selected by the second network element. When a plurality of data packets with congestion tags in their headers and differing ordering requirements are received by the second network element, the oldest of the plurality of data packets may be selected and on receipt of the first control token the third network element prevents transmission of further data packets having the same ordering requirement as the selected data packet.

In accordance with the preferred embodiment, in response to the third network element receiving a first control token, the method further comprises the steps of the third network element halting transmission of data packets having the same ordering requirement as the data packet selected by the second network element; and the third network element awaiting instructions for the re-routing of the halted data packets.

Ideally, the second network element identifies an uncongested network link after a data packet having a congestion tag in its header has been selected by the second network element. Moreover, the second network element may identify an uncongested network link only after delivery acknowledgements have been received for all data packets having the same ordering requirement as the selected data packet.

With the preferred embodiment the activity of the network links connected to the input ports of the network elements may be monitored whereby the step of identifying an uncongested network link comprises identifying the least active network link connected to an input port of the second network element. The activity of the network links may be monitored by counting the number of sequential idle cycles with the least active network link corresponding to the network link having the largest number of sequential idle cycles.

Also, once the second network element has received delivery acknowledgements for all data packets having the same ordering requirement as the selected data packet, the second network element preferably issues a re-routing instruction to the third network element including information on the uncongested network link that has been identified. Once the second network element has issued a re-routing instruction to the third network element, the second network element may be adapted to prevent issuance of further re-routing instructions in respect of the congested network link for a predetermined period of time. Also, once the second network element has issued a re-routing instruction to the third network element, the second network element may be adapted to prevent issuance of further re-routing instructions including information on said uncongested network link for a predetermined period of time. Preferably, the third network element does not re-route data packets for which transmission has been halted until delivery acknowledgements are received by the third network element for all previous data packets having the same ordering requirement as the halted data packets. Moreover, the halted data packets are re-routed by the third network element on a different network link selected on the basis of the information on the uncongested network link received from the second network element. Ideally, the first network element continues to transmit data packets on a congested network link even after congestion has been detected on the congested network link. Also, when the congestion arises from a congested egress port of the multi-path network, data packets which are intended for the congested egress port are not re-routed.

Ideally, each network link is shared by a plurality of individually selectable link channels and one link channel of each network link in the path of a first data packet being transmitted across the network is individually assigned exclusively to subsequent data packets having the same ordering requirement as said first data packet until an acknowledgement of the most recent preceding data packet having the same ordering requirement is transmitted back by an exclusively assigned link. Furthermore, a delivery acknowledgement is issued by an egress port of the multi-path network when a data packet is received at the egress port, the delivery acknowledgement being transmitted across the network following in reverse the path taken by the data packet being acknowledged, and wherein the state of each link channel in the path taken by the data packet being acknowledged is updated by the acknowledgement.

When the multi-path network includes at least one degree of symmetry, future data packets may be re-routed by a network element in a switch stage symmetric with the switch stage of the second network element. Also, the network link selected for transmission of the re-routed data packets may be symmetric with the uncongested network link of the second network element.

In a further aspect the present invention provides, a multi-path network for use in a bridge, switch, router, hub or the like, the multi-path network comprising a plurality of network ports; a plurality of network elements arranged in a plurality of switch stages; and a plurality of network links interconnecting the network elements and the network ports for transporting data packets, each network element having:
  at least one congestion detector for detecting congestion on a network link connected to an output port of the network element; and
  at least one link activity monitor for identifying an uncongested network link connected to an input port of the network element, and
  the network elements being adapted to communicate information concerning an uncongested network link as an alternative to a congested network link.

Ideally, each network element has a plurality of input ports and each input port has associated therewith at least one data packet buffer, the congestion detector being adapted to monitoring the content of the data packet buffers whereby congestion is detected when the content of a data packet buffer exceeds a predetermined threshold.

Also, the link activity monitor is adapted to identify the least active network link connected to an input port of the network element. Ideally, the link activity monitor is adapted to count the number of sequential idle cycles of each input port of the network element whereby the least active network link corresponds to the network link having the largest number of sequential idle cycles.

In the preferred embodiment the multi-path network includes a plurality of egress ports, with the egress ports being adapted to issue a delivery acknowledgement when a data packet is received, the network elements being adapted to transmit the delivery acknowledgement across the network following in reverse the path taken by the data packet being acknowledged.

Ideally, the multi-path network includes at least one degree of symmetry and data packets are re-routed by a network element in a switch stage symmetric with the switch stage of the network element that receives the congestion tag.

Of course, each one of the plurality of network links may be a duplex link permitting signals to be transmitted in opposing directions simultaneously. In a yet further aspect the present invention provides an Ethernet bridge or router comprising a multi-path network as described above.

Current and future proposed congestion management protocols are complimentary to the present invention due to the fact that the present invention seeks to remove congestion at a point below any congestion management protocols. Hence, higher level protocol features may remain dormant on either side of a multi-path network which implements the method of the present invention: they are simply not required. Furthermore, the present invention is fully interoperable with current and future congestion management protocols. Should an intermediate network station supporting the present invention be interposed between stations implementing a higher level congestion management protocol, the redundant congestion protocol is simply routed, allowing devices on either side to benefit, if possible.

The foregoing and other objects, aspects and advantages will be better understood from the following detailed description of a preferred embodiment of the present invention with reference to the drawings, in which:

DETAILED DESCRIPTION OF THE PREFERRED EMBODIMENT

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs.

In the context of this document the definitions of an intermediate station is extended to include a station capable of forwarding packets encapsulated at the additional protocol layer referred to herein as the Encapsulation Layer. This type of station will be referred to herein as a Bridge Fabric or Network Fabric. A multi-port Bridge Fabric may be implemented by a collection of Bridge Fabric Switches (BFSs) interconnected by Bridge Fabric Switch Links (BFSLs).

Complete encapsulation in a PDU, which is the subject of co-pending United Kingdom patent application number 0807937.8, the whole contents of which is incorporated herein by reference, and which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of data transmission, acknowledgement and flow-control mechanisms. A FPDU can be further utilised to provide many other attractive features important to large, high performance, scalable Ethernet networks.

Figure 1:
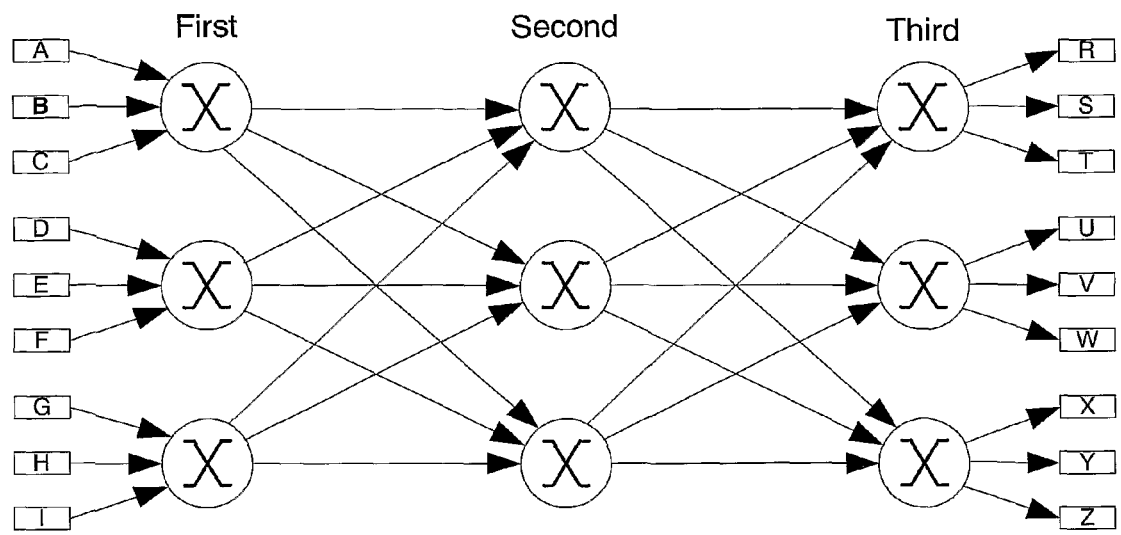
FIG. 1 shows a conventional network.
Figure 2:
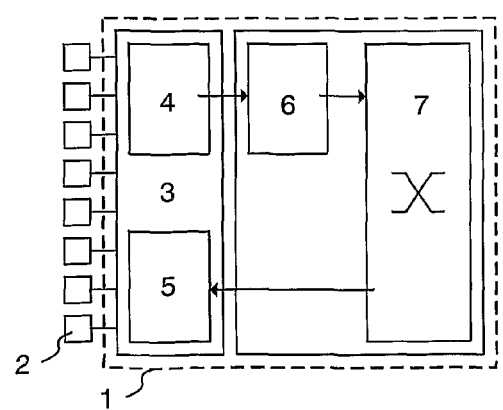
FIG. 2 illustrates a conventional crossbar of the network of FIG. 1.
Figure 3:
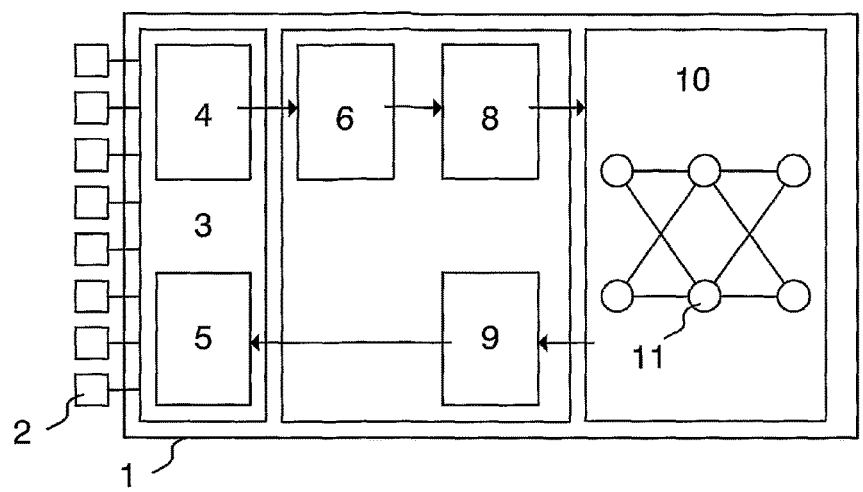
FIG. 3 illustrates schematically an Ethernet bridge that includes a multi-path network that implements a congestion management method in accordance with the present invention.

An Ethernet bridge or router 1 is illustrated in FIG. 3 which may be connected to a plurality of separate Ethernet stations 2 and which implements the encapsulation of both Network Layer and Data Link Layer PDUs in a FPDU. The Ethernet bridge 1 generally comprises a multi-path network 10 in combination with a plurality of Ethernet ports 3 (only one is illustrated for the sake of clarity) with each port being individually connectable to an Ethernet station 2. The Ethernet ports 3 are generally conventional in design and each includes means for establishing a data connection with an Ethernet station, a receiving means or input 4 for performing Ethernet receive functions and a transmitting device or output 5 for performing Ethernet transmit functions.

The Ethernet ports 3 are connected to a network interface 7 that provides conventional functionality such as packet buffering 6. However, the network interface 7 additionally includes an Ethernet PDU encapsulator 8 which connects the network interface 7 to ingress ports (not shown) of the network 10 and an Ethernet PDU decapsulator 9 which connects egress ports (not shown) of the network 10 back to the Ethernet ports 3. The Ethernet PDU encapsulator 8 implements the protocol of the Encapsulation Layer and thus is responsible for the generation of the FPDUs. Ideally, each port 3 of the Ethernet bridge 1 has a respective network interface 7 and thus a respective Ethernet PDU encapsulator 8 and a respective Ethernet PDU decapsulator 9.

Figure 4:
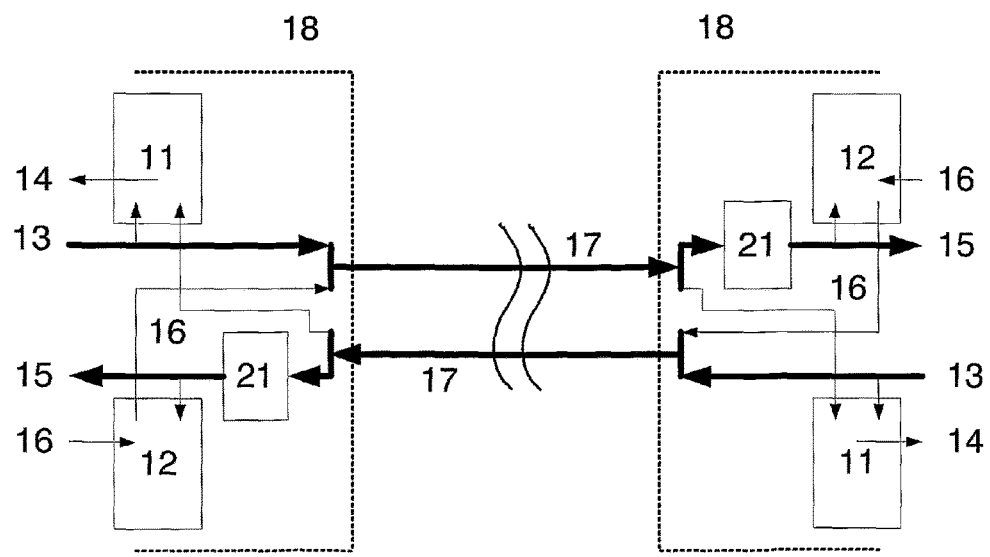
FIG. 4 is a schematic diagram of a link of the multi-path network of FIG. 3, in accordance with the present invention.
Figure 5:
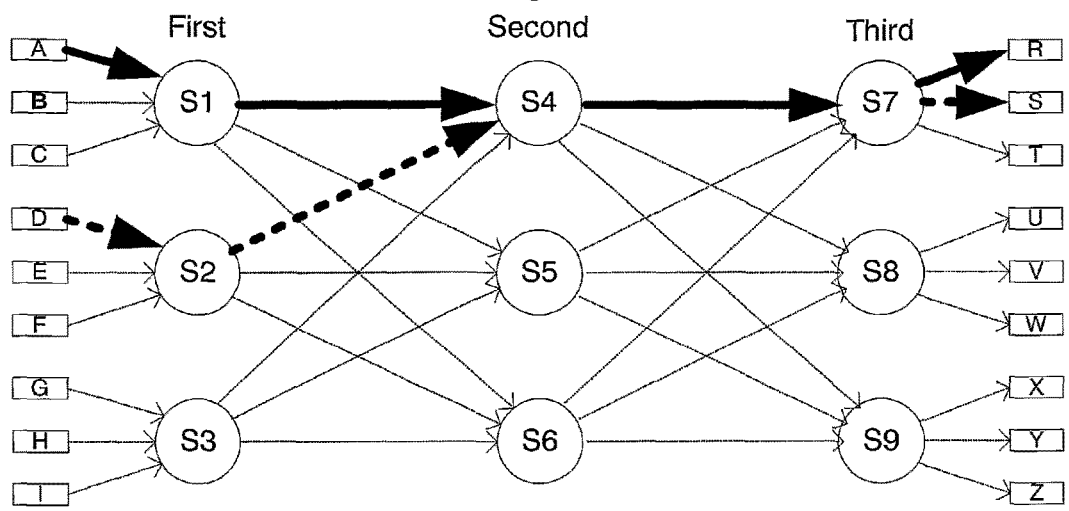
FIG. 5 is a schematic diagram of a simplified multi-path network in accordance with the present invention showing a scenario in which congestion is expected to arise.

The network 10, which is a proprietary multi-path network such as the one shown in FIG. 5, comprises a plurality of interconnected network elements 18 referred to herein as bridge fabric switches (BFSs) interconnected by network links 17 in the form of bridge fabric switch links (BFSLs). Each BFSL 17 is preferably a bi-directional (full duplex)

connection. Data is sent in each direction and acknowledgments and flow control state for data in one direction can be multiplexed with the data sent in the opposite direction of the BFSL. FIG. 4 illustrates a BFSL 17 in combination with the input and output connections to the link 17. Of course, in a large network there will be a large number of BFSs and a packet traversing the network 10 will pass through many BFSs 18 and BFSLs 17 before egress from the network. As mentioned earlier, network packets transmitted, across the network fabric are referred to herein as Fabric Protocol Data Units (FPDU) and these correspond to encapsulated Ethernet PDUs.

The present invention can be applied to any network where there are multiple routes from a source or ingress port to a destination or egress ports. All the examples given below show unidirectional links to improve the clarity of the diagrams but the mechanism is equally valid for a full duplex link implementation.

The present invention is based on the idea of actively and continually monitoring the levels of both congestion and under-utilization within the network and, when necessary, re-routing some of the traffic flows across other parts of the network in order to better load balance the network as a whole, thereby increasing network utilisation.

The implementation of the present invention is a three step process, namely:
1. Detection of congestion—this occurs in the Congesting Switch (CS);
2. Detection of spare network bandwidth—this occurs in the Redirecting Switch (RS); and then
3. Movement of some of the congested traffic away from congested links and onto un-congested links—this occurs in the Adapting Switch (AS).

Also, the invention relies upon the communication of small amounts of control information between individual BFSs in the network.

FIG. 5 illustrates a simple example of a traffic flow that is suffering congestion. Here ingress port A is sending to egress port R and ingress port D is sending to port S. The illustrated multi-path network is assumed to be a 10 Gbe Ethernet bridge in which the bandwidth of the network ports matches the bandwidth of the BFSs and the BFSLs. Thus a single port sending data at 100% of its rate requires 100% of the capacity of the BFSs and the BFSLs to avoid congestion.

In this example the congestion occurs in BFS S4 which is the Congesting Switch (CS) while trying to send data to BFS S7. Only BFS S4 is able to detect the congestion. Congestion cannot be reasoned at BFS S7 because the two streams of interleaving FPDUs entering BFS S7 would have the same pattern if ingress ports A and D were only trying to send data at 50% their maximum rate and in that case there would be no congestion. However CS S4 is receiving data at the full (100%) rate on two input links and so must buffer this data to prevent it being lost. Congestion then occurs once the BFS input data buffers are being filled faster than they are being emptied.

Independently of the congestion at BFS S4, RS S7 is able to recognise that only one of its input links is receiving data. It can also measure to what, if any, extent its other two input links are being used. In the illustrated example the other two links of RS S7 are not being used at all.

Figure 6:
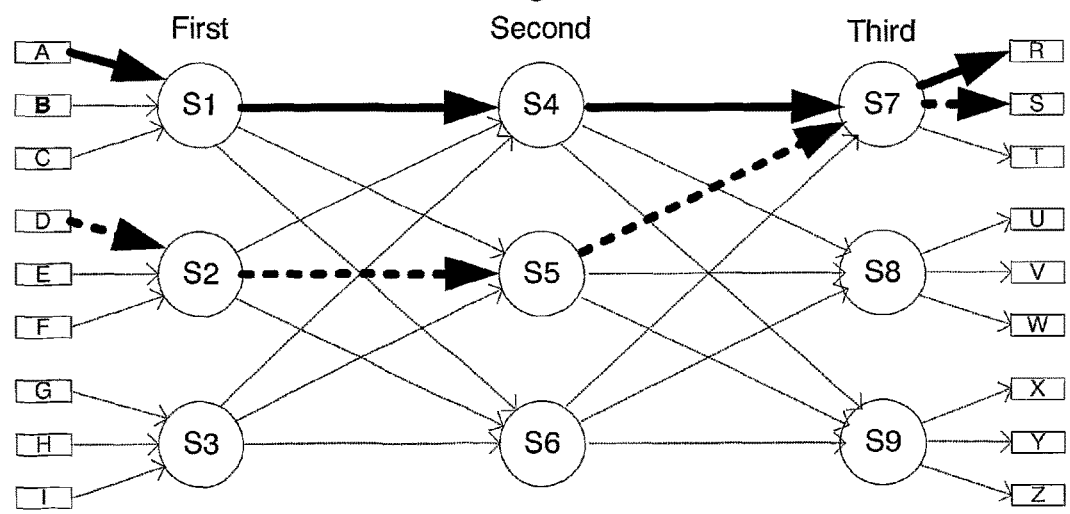
FIG. 6 is a schematic diagram of the multi-path network of FIG. 5 with a first solution to the congestion problem.
Figure 7:
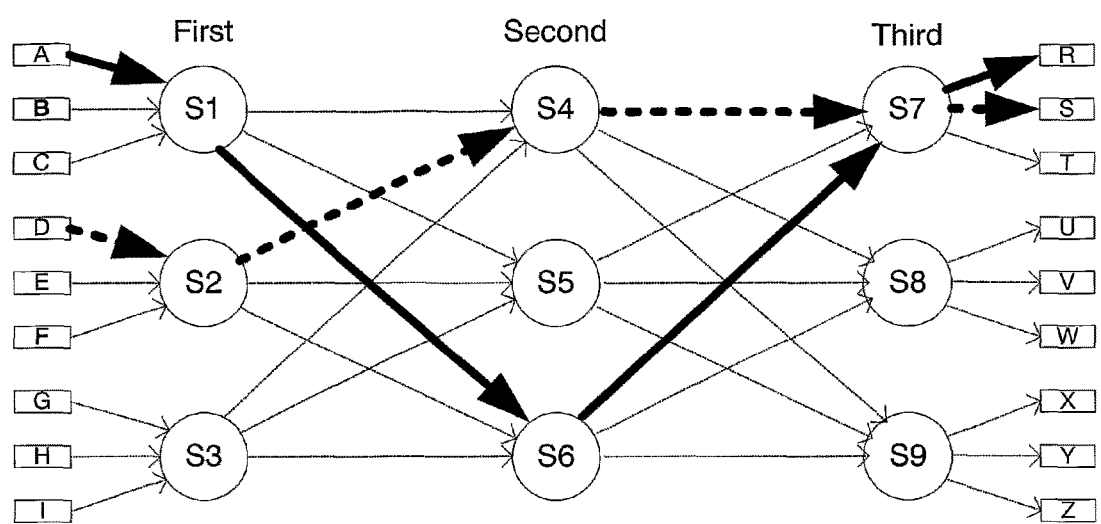
FIG. 7 is a schematic diagram of the multi-path network of FIG. 5 with a second solution to the congestion problem.

FIG. 6 and FIG. 7 show two solutions that correct the congestion problem shown in FIG. 5. Both solutions require a different link to be used between the first and second stages of switching. In FIG. 6 the congestion is removed by changing the network route of the data stream from ingress port D to egress port S. In this case BFS S2, which becomes the Adapting Switch (AS), starts sending data to BFS S5 instead of to the CS S4. In FIG. 7 the congestion is removed by changing the network route of the data stream from ingress port A to egress port R. In this case it is BFS S1 which is the Adapting Switch as it starts to send data to BFS S6, instead of to the CS S4.

It will have become apparent that the two solutions described above are not the only solutions to the problem of congestion at CS S4. Two other solutions exist (not shown) to fix the congestion illustrated in FIG. 5 and here too one of the network routes of the two data streams must be moved. Thus, it may be seen that all of the solutions to a congestion problem at the second stage of switching in the network, require a switching change at the first stage of BFSs in the network. Hence, in this network the adaptive selection of a new non-congesting route is performed in the first switching stage. Both the second and third stages of switching solely operate to direct the data to the destination of the FPDUs.

With the methodology implemented in the multi-path network congestion control information is communicated in the form of tags that are added to the headers of FPDUs moving through the network. Thus, an FPDU is used to carry a tag that indicates that the previous BFS, i.e. the BFS the FPDU has just left, is congested.

Additionally, a reverse acknowledgement control flow is also provided in the form of a small amount of control information that is used to indicate the successful transmission of the bulk data in the forward direction. This control information could be provided through the use of additional sideband signals or could be implemented by stealing a small amount of bandwidth from the reverse direction on a full duplex link.

Figure 8:
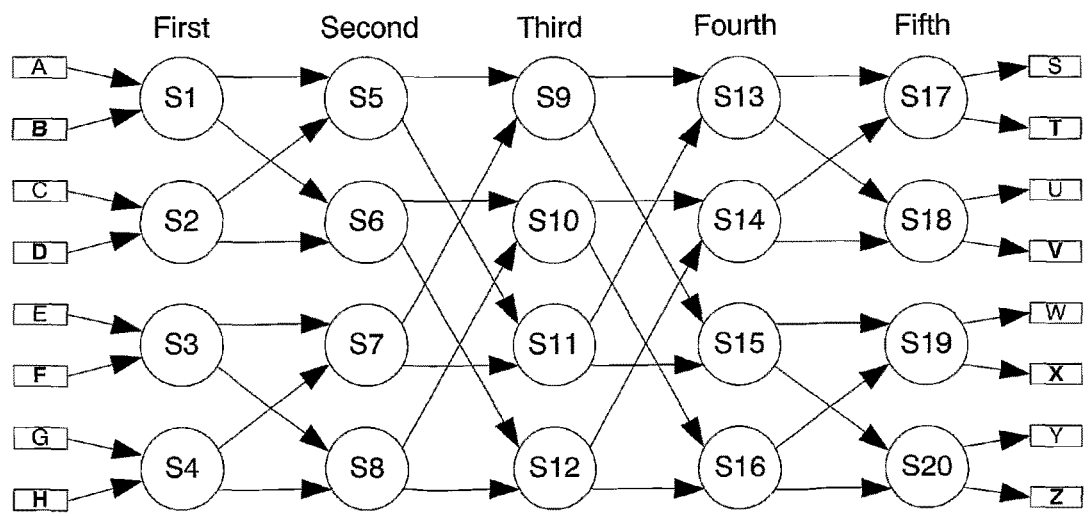
FIG. 8 is a schematic diagram of an alternative symmetrical multi-path network in accordance with the present invention.

The reverse acknowledgement control flow performs two useful functions. Firstly it signals the delivery of data packets to their destinations. This is used to provide control of packet ordering in an otherwise dynamic routing multi-path network. If a data flow has to be changed to relieve congestion, then new FPDUs are not released onto the link of the new route until all the acknowledgments relating to data transmitted over the old route have been received at the point in the network where the route change is going to take place. Secondly the use of reverse acknowledgements provides a means for communicating re-routing information back to earlier stages in the network to enable a data flow to be redirected onto less congested links. The previous example of FIGS. 5, 6 and 7 illustrated a network with two levels of destination switching and one adaptive switching. However, the present invention will also work well for other and higher levels of switching. FIG. 8 illustrates an example of a multi-path network with 3 levels of destination switching (BFS S9 to S20) and 2 levels of adaptive switching (BFS S1 to S8). The arity of these switches has been reduced to simplify the example.

Looking at FIG. 8 it can be seen that the illustrated network is symmetrical. Symmetry is not a requirement of the present invention but can simplify identification of the Adapting Switch required to remedy a congestion situation using the congestion management method of the present invention.

Figure 9:
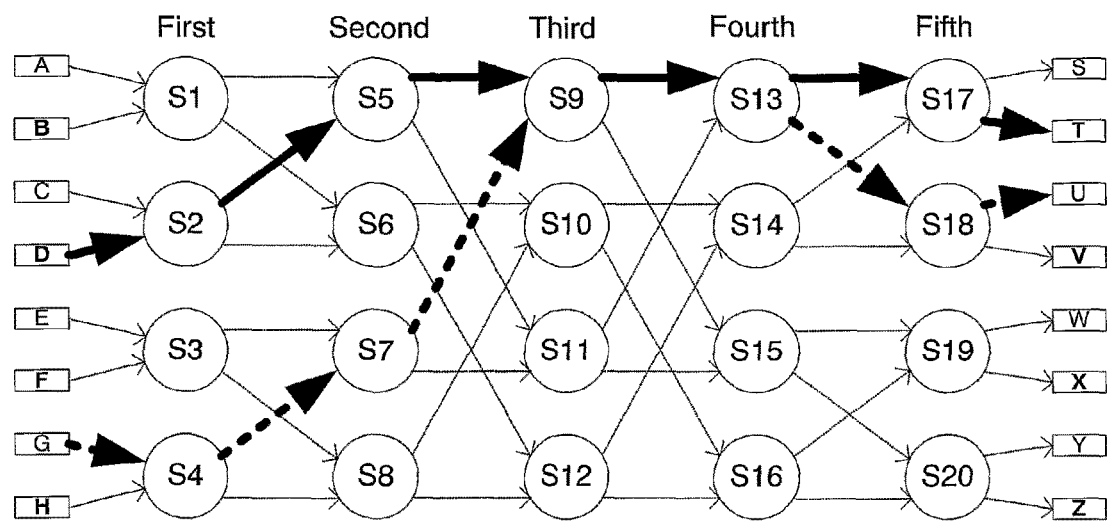
FIG. 9 is a schematic diagram of the network of FIG. 8 showing a scenario in which congestion is expected to arise.

In FIG. 9 the multi-path network of FIG. 8 is shown with two connections attempting to utilise the same network link and thus congesting the link:
the first connection is from ingress port D to egress port T and the second connection is from ingress port G to egress port U. The congestion is occurring between the third and fourth stages of network switching and in this case BFS S9 will detect congestion and become the CS whilst and BFS S13 will look for other uncongested links and become the RS. In the case of the network of FIG. 8 it is relatively easy to identify an uncongested link as the BFS has only two input ports so the link to the other of the two input ports must automatically be identified as the uncongested link. In practice, real networks will use BFSs constructed with a much higher arity. A method for identifying lack of congestion in the context of higher arity BFSs is described later in this document.

Figure 10:
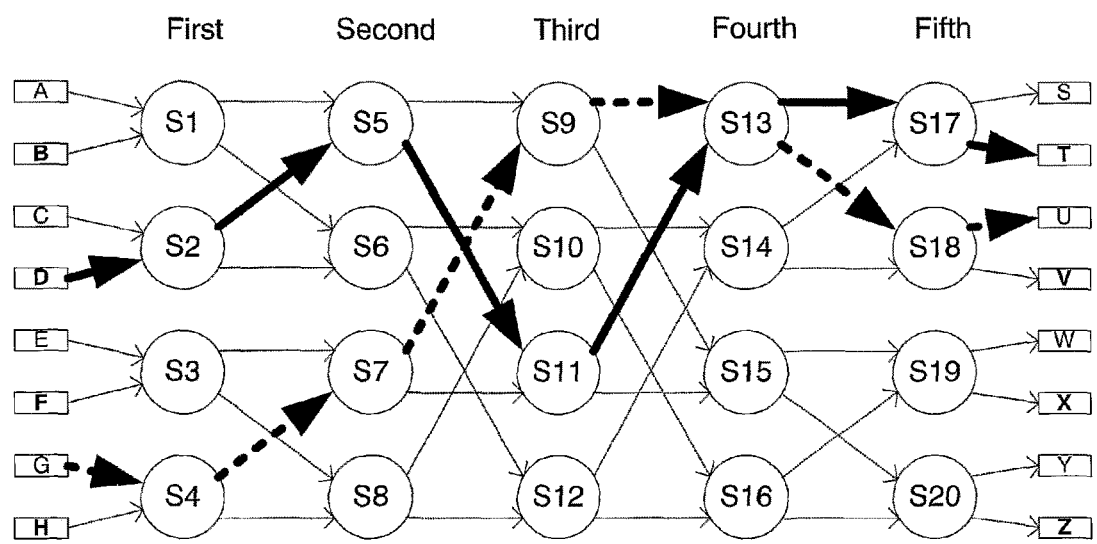
FIG. 10 is a schematic diagram of the network of FIG. 8 with a first solution to the congestion problem.
Figure 11:
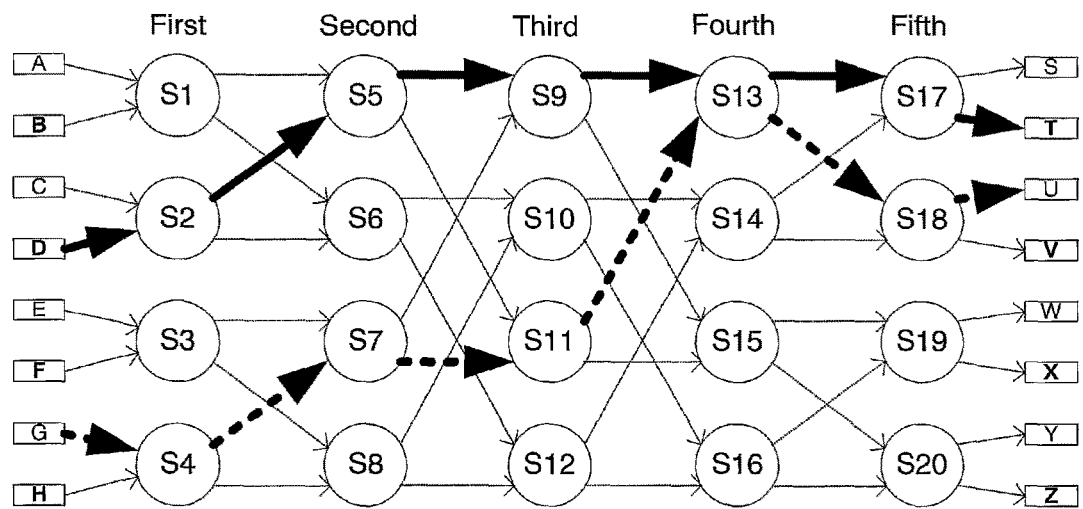
FIG. 11 is a schematic diagram of the network of FIG. 8 with a second solution to the congestion problem.

FIGS. 10 and 11 show that to address the congestion problem of FIG. 9 a change must be made either on BFS S5 to change the D to T flow or on BFS S7 to change the G to U flow. The former solution is shown in FIG. 10 and the latter in FIG. 11. With both solutions, as the network is symmetric, and with the congestion arising between the third and fourth stages of the network, so the re-routing must occur between the second and third stages i.e. the AS is in the symmetrically equivalent stage of the network as the RS.

Figure 12:
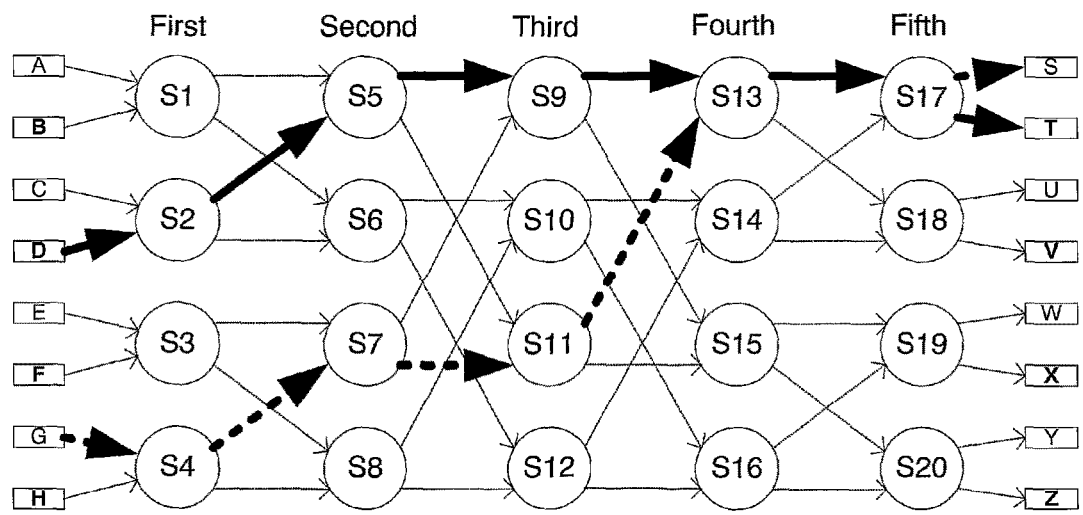
FIG. 12 is a schematic diagram of the multi-path network of FIG. 8 with an alternative scenario in which congestion is expected to arise.
Figure 13:
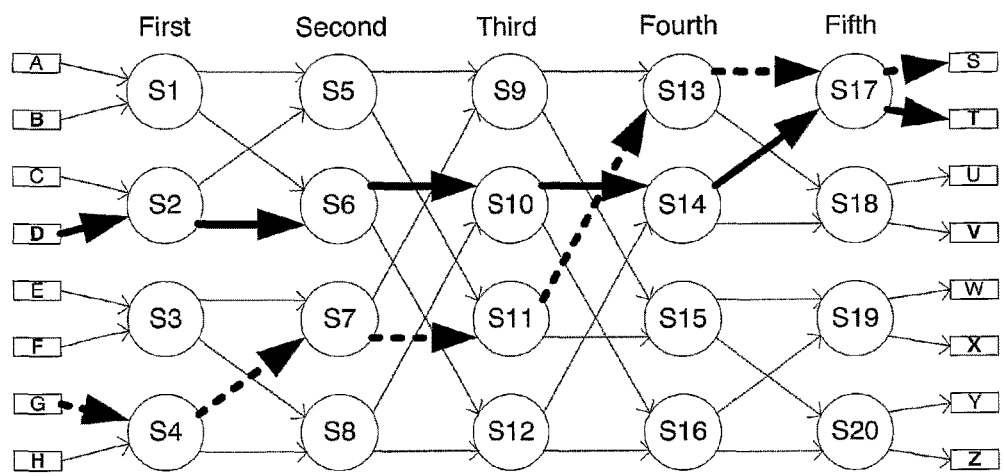
FIG. 13 is a schematic diagram of the network of FIG. 8 with a first solution to the congestion problem of FIG. 12.

In FIG. 12, two different connections across the multi-path network are illustrated, this time creating congestion between the fourth and fifth switching stages. In the example of FIG. 12 there is a data stream from port D to port T and another from port G to port S. With the RS located at the fifth stage of the network, so an appropriate AS is to be found in the first stage of the network. Thus, selecting an alternative network link for the first connection at BFS S2 results in a new route across the network which avoids the link between BFSs S13 and S17, as shown in FIG. 13. Alternatively, selecting an alternative network link for the second connection at BFS S4 similarly results in a new route across the network for the connection between port G and port S which avoids the link between BFSs S13 and S17.

Figure 15:
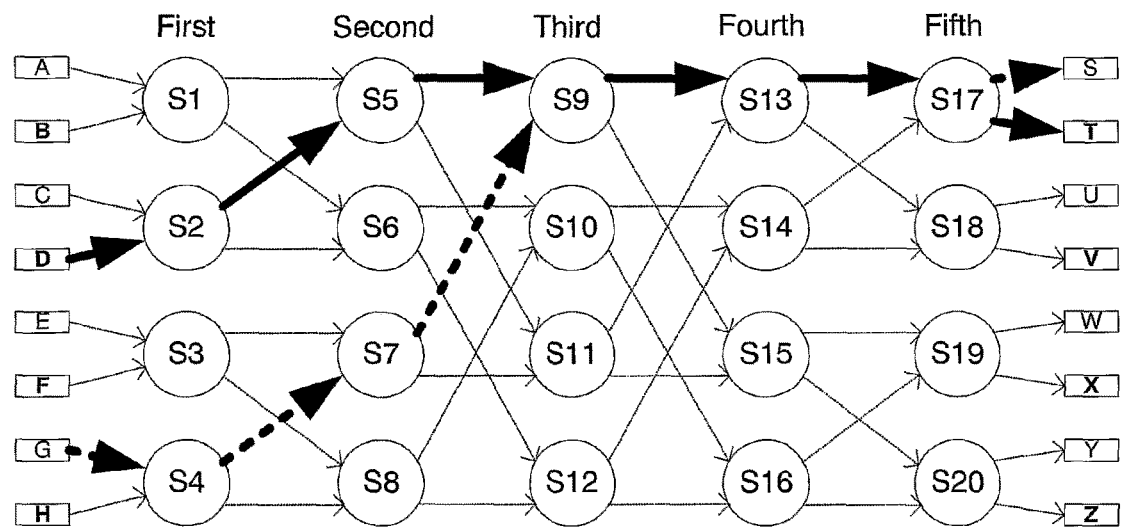
FIG. 15 is a schematic diagram of the multi-path network of FIG. 8 illustrating a third scenario in which congestion is expected to arise.

FIG. 15 gives a final, more complex example of a traffic flow where both streams are routed over two links. In this case the preferred route correction would correct for congestion at BFS S17. However, the congestion is only detected by BFS S9 i.e. the CS is BFS S9. As a result, full correction of the congestion requires two separate correction operations.

Figure 14:
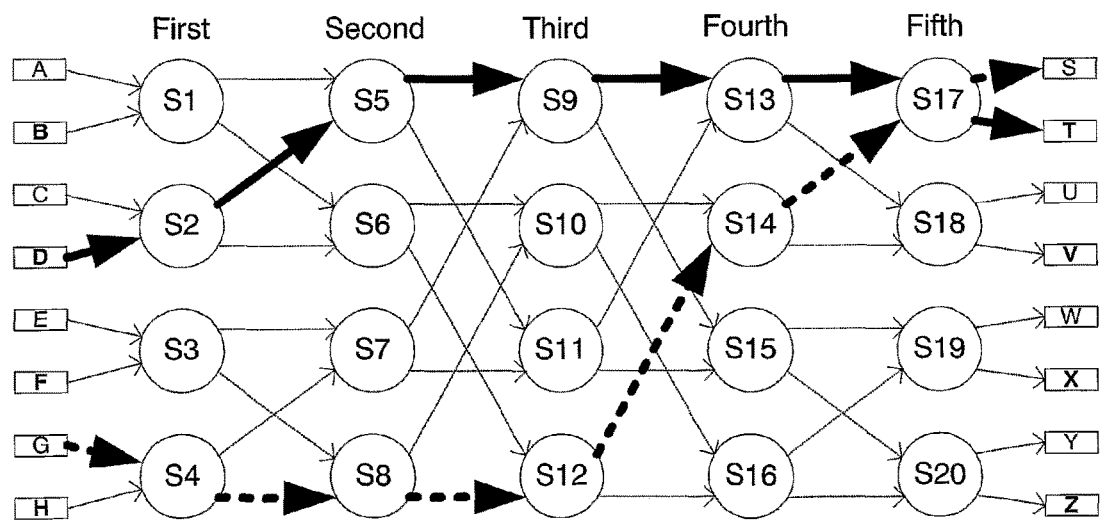
FIG. 14 is a schematic diagram of the network of FIG. 8 with a second solution to the congestion problem of FIG. 12.

The first correction operation identifies BFS S13 as the RS and the solutions to the congestion correspond to the solutions illustrated in FIGS. 10 and 11. This rerouting of the data packets would generate a new, still congested traffic pattern corresponding to the congestion illustrated in FIG. 12 with BFS S17 as the RS. This second tranche of congestion may then be corrected using similar solutions to those illustrated in FIGS. 13 and 14 The above examples show that a simple algorithmic approach can be used to identify the AS where a change has to occur to correct a congestion problem. Where the network has symmetry and the congestion correction requires the data packets to come in on a different link on the switching stage closest to the egress ports then the change must be made on the switching stage closest to the ingress ports. If the congestion correction is needed on the second closest stage of BFSs to egress, then the change must occur on the second closest stage of BFSs to ingress. This rule applies equally for networks having different numbers of stages, different symmetry, different numbers of ports and different degrees of interconnection. Even where the network has a completely different topology, similar rules, reflecting the differences in the topology, can be identified to find the appropriate BFSs where routing changes must be made.

The networks illustrated in the figures have BFSs with two input ports and two output ports. It may also be seen that if a data stream comes in on the top input port of a fifth network stage BFS then it left the top output port of a first network stage BFS. Likewise, if the data stream comes in on the top input port of a fourth stage BFS then it left the top port of a second switching stage BFS. Provided a similar symmetry exists in a network that has BFSs with a much higher arity, then consistent numbering of the BFS ports allows the RS to identify easily the correct output port the AS should use to make the data packets arrive on an uncongested link into the RS. In the alternative, each BFS may include a map of the network which would enable identification of an alternative route across the network to the alternative uncongested BFSL of the RS.

The multi-path network described herein preserves packet ordering whilst providing dynamic routing, and ideally adaptive routing, of FPDUs across the network through the use of acknowledgements. By arranging for a packet acknowledgement to be released immediately the head of the FPDU is received at one or more egress ports bandwidth usage can be significantly increased. That is to say, release of the FPDU acknowledgement is not delayed until after the entire payload of the FPDU is received. Thus, while the body of the FPDU is still being transmitted across the network, the acknowledgement is already in transit back to the ingress port of the FPDU. If the FPDU is big enough and the network delivery time is low enough, then the acknowledgement will be received at the ingress port before the ingress port has finished transmitting the whole of the FPDU. The next FPDU can then be sent and adaptively routed without any possibility of it being received before the first and without any possibility of it being duplicated because no network reconfiguration is required to maintain a single route.

This same packet ordering technique is also employed to maintain packet order when, as a result of congestion, a series of data packets is interrupted and the latter data packets rerouted.

To enable packet order to be maintained, each BFSL of the network is assigned a plurality of "flow channels" to support one or more source to destination connections simultaneously (where the source is defined as an ingress point to the network, and the destination is defined as an egress point (or points) from the network). Having many flow channels increases the amount of time a channel can be held open without having to wait for the acknowledgment to be returned.

The full network source to destination flow of a FPDU uses a series of single flow channels each allocated in turn on each BFSL the FPDU visits as it crosses the network. Whilst the particular flow channel used by an FPDU might differ for each individual BFSL visited, during transit of the FPDU across the network, each flow channel entry on a BFSL has enough state to map the corresponding flow channel of the previous BFSL the FPDU used to arrive at the current flow channel entry. As a result the network, as a whole, records the path of the FPDU as it crosses the network from source to destination.

FIG. 4 illustrates a BFSL 17, between two interconnected BFSs 18, providing a flow channel that is part of a data stream from a network ingress port to a network egress port. For simplicity in FIG. 4 only the FPDU channel 17 is shown although the acknowledgements 14 are illustrated within the BFSs 18.

Each flow channel is mapped onto a BFSL 17 and each BFS at each end of the BFSL 17 includes a first state table 11 in the form of an output flow channel table (OFCT) and a second state table 12 in the form of an input flow channel table (IFCT) in which entries specific to each flow channel of the BFSL 17 are recorded and stored until over-written. Each location in the OFCT 11 has an associated location in the IFCT 12 in the form of a directly corresponding location in the IFCT 12. For example OFCT entry 3 corresponds to IFCT entry 3. Moreover, some of the IFCT state is a copy of the OFCT state and some of the OFCT state is a copy of the IFCT state. In use, output data 13 is multiplexed with acknowledgment values 16 relating to FPDUs transmitted in the opposite direction to create the BFSL data stream and at the next BFS 18 the input data 15 to the BFS 18 is separated from acknowledgments 16 concerning FPDUs transmitted in the other direction.

FPDUs received from a BFSL are buffered in one of a plurality of buffering devices 21, preferably FIFOs, (only one is shown in the figures for the sake of clarity) while they wait to make a connection to a data crossbar switch which forms part of each BFS 18. The flow channel number of the received acknowledgments 16 is used to index the OFCT 11 to retrieve the mapping of the previous BFSL and this is appended to form a routable acknowledgment 14 that is sent to an acknowledgment crossbar switch. With the multi-path network described herein, a "source to destination" connection is dynamically established across the whole network as a first FPDU travels across the network and then remains exclusively allocated to subsequent FPDUs having the same ordering requirement whilst any preceding FPDUs with the same ordering requirements remains in transit. The ordering requirements may be, but are not limited to the following: a source to destination address, with or without a level of priority; a message class; VLANS; higher level protocol requirements; IP numbers; or quality of service. This is achieved by storing in the OFCT 11 a destination address value and state which describes the upstream path, back towards the source ingress port, for the most recent FPDU transmitted by a flow channel of the BFSL 17. Thus, in the OFCT 11 a plurality of destination address values and states for a plurality of FPDUs are stored each destination address value and state being stored in association with a respective flow channel of the BFSL.

The basic methodology for transmitting an FPDU on one or more BFSLs of a plurality of BFSLs of a network fabric, is as follows. When a new FPDU is received for transmission on the BFSL 17, the header data of the new FPDU is checked to see if the FPDU's ordering requirements match any of the valid channels of that BFSL. This match is executed by performing a parallel compare of all the entries in the OFCT 11. Each compare is an equality test between the ordering requirement in the header of the FPDU and the ordering requirement stored in the OFCT 11. Each compare also requires an equality test of the source port and source flow channel the FPDU has come from.

If no match exists then an empty/unused channel is allocated and the input port of the BFS, the flow channel of the BFSL and ordering requirement data of the FPDU are stored in relation to the allocated channel in the OFCT 11. The empty/unused channel may be allocated by the BFS randomly or quasi-randomly or may be allocated using one or more predefined rules. If a match does exist, then the FPDU is allocated the same flow channel that most recently carried a previous FPDU with matching ordering requirement data. The state of the allocated channel is then updated in the OFCT 11 with information representative of the new FPDU (which is described in greater detail below).

Each BFS 18 has a data crossbar switch that is used to transport data from an input BFSL 17 to an output BFSL 17. Each BFS 18 also has an acknowledgment crossbar switch, in parallel with the data crossbar switch, which is used to return BFSL acknowledgment tokens back from a network egress port to the network ingress port. As mentioned earlier, the OFCT 11 holds for each flow channel the return address for the most recently transmitted FPDU. This return address is in two parts: it has the port number the FPDU came from and also the flow channel assigned on the previous BFSL. The return address is used for the acknowledgement token of that FPDU to direct the acknowledgment from the BFS data output port through the acknowledgment crossbar switch into the IFCT 12 where it can be directed as a new acknowledgement token back to the next BFS in the acknowledgement's return path towards the ingress port for that FPDU. Each flow channel is assigned a count value representative of the number of units of data transmitted which is referred to herein as the Data Flow Count (DFC). The DFC value is incremented by the size of the FPDU being transmitted. The count value of each of the flow channels is held at both ends of the BFSL 17. The DFC has a master value at the sending end of the BFSL and a slave (copy) value at the receiving end. Thus, for data the master DFC value is held in the OFCT 11 and the slave DFC value is held in the IFCT 12. Each flow channel is also assigned a count value representative of the number of acknowledged units of data which is referred to herein as the Acknowledgement Flow Count (AFC). The AFC master value is held in the IFCT 12 and the AFC slave value is held in the OFCT 11. When the DFC reaches a predetermined maximum value it simply wraps back through zero. Overflow on the DFC is acceptable as it is only ever compared against the AFC that will also wrap back through zero in the same way as it is assigned the same predetermined maximum value.

The unit measure of data is set as a predetermined number of bytes. This unit measure is set small enough to give reasonable resolution but big enough to minimise state and overhead on the size of headers in the FPDUs and the size of the acknowledgements returned. In one embodiment it is envisaged that the count values correspond to a count of whole FPDUs, instead of the total data size held in the FPDUs. This gives the same understanding of FPDU ordering but removes the knowledge of total data against the flow channel.

Once a new FPDU has been allocated a flow channel and is to be output on that flow channel, the number of units of data being sent in the FPDU is calculated from the size field in the FPDU header. The master DFC value stored in the OFCT 11 in relation to the flow channel allocated to that FPDU is then incremented by the number of units of data being sent in the FPDU. Furthermore, the new DFC value is inserted into the header of the FPDU for transmission on the BFSL 17. Once the PFDU is received at the next BFS, the DFC value is read from the FPDU header and loaded into the slave data flow count value held in the IFCT 12 of that BFS.

A similar rolling count value is established in relation to the returning acknowledgement which is described in greater detail below. At any moment in time, the channel count value is calculated by taking the difference between the two rolling count values that are part of the state of the flow channel. Before any FPDUs are enabled for transmission all the DFC and AFC stored in the OFCT 11 and the IFCT 12 are initialised to the same value making the difference between the rolling count values equal to zero. Once initialised the DFC and AFC values are then only changed by the passing FPDU data and acknowledgments using the BFSL.

When the header of the FPDU is received at the final destination egress port of the network fabric, an acknowledgement is immediately returned.

As mentioned earlier, issuance of the acknowledgement is not delayed pending receipt of the entire payload of the FPDU. The acknowledgement is automatically routed back to the original ingress port following in reverse the path taken by the FPDU in the forward direction. This is done using the input port number and input flow channel number stored in each of the OFCTs 11.

The acknowledgement includes information taken from the header of the FPDU that generated the acknowledgement on the unit size value of the FPDU. During the transit of the acknowledgement across the network fabric back to the ingress port, at each BFSL 17 in the reverse path the second rolling master AFC value, stored in the IFCT 12 is adjusted by the size value held in the returning acknowledgement. Likewise, this master AFC value is included in the acknowledgment token returned on the BFSL 17 and is loaded into the slave AFC value held in the OFCT 11.

As already stated the difference between the two rolling counts indicates the total amount of unacknowledged data. The values can be compared in either the OFCT 11 or the IFCT 12. It should be noted that, due to the transmission delay along a BFSL the DFC value is updated in the OFCT 11 before it is copied into the IFCT 12 and likewise the AFC is updated in the IFCT 12 before it is copied into the OFCT 11. This has the effect of making the comparison of the Master DFC value and the Slave AFC in the OFCT 11 appear to be different for longer than the comparison of the Slave DFC value and the Master AFC value in the IFCT 12.

When the comparison of the rolling counts produces a zero difference, then all the FPDUs sent along the flow channel of this BFSL for this source/destination pair have been acknowledged as being at least accepted by the destination port. This means that a following FPDU with the same ordering requirement may be dynamically routed safely, using alternative flow channels and an alternative path across the network fabric, without the risk of the following FPDU reaching the destination port or ports out of order with respect to earlier FPDUs transmitted across the network fabric having the same destination. This also means that when the difference between the rolling counts is zero, the flow channel is considered empty and can be re-used for another ordered flow. It should be noted that the rolling count values are not reinitialised from one FPDU to the next even if the difference becomes zero and the channel is empty. The next flow that re-uses the flow channel adopts the new starting values that are probably non-zero but start with a count difference of zero.

If the difference between the counts is not zero, then it is not safe to adaptively route a new FPDU having the same ordering requirements as there is a risk that it might arrive at the egress port out of order. In this case the new FPDU must be routed along the same path, using the same flow channel, as the previous FPDU for this source/destination. This is done by using the destination port number or other number with ordering requirements stored in the IFCT 12 which was loaded the first time a connection was made on the data crossbar for an FPDU having the same ordering requirements.

In the case where a BFSL becomes congested, all the data packets already in transit across the network beyond the BFS which will become the AS, must be acknowledged before any rerouting of further data packets can be implemented. Otherwise, there is a risk that a rerouted data packet will be delivered out of order and ahead of earlier data packets which remain in the congested area of the network. The acknowledgment methodology described above is used to ensure that packet order is maintained.

Firstly, however, congestion on a BFSL must be identified. To do this, the depth of the data waiting in the buffers 21 of the BFSs is monitored and used as a simple measure of congestion. The more congested an output port is the deeper the depth of the queue the data is being delivered from. Hence, detecting more than a fixed buffer depth is a good enough measure for marking a FPDU (and the BFSL it requires) as being congested. Of course, alternative conventional techniques may be employed to detect congestion on the BFSLs but for the purposes of the following discussion, it is assume that link congestion is detected through monitoring the queue depth of the buffers.

Once a BFS 18 detects congestion on one of the network links 17 connected to one of the BFS output ports, the next FPDU being transmitted on the congested link has a tag added to the header of the FPDU indicating that the FPDU is being transmitted on a congested network link. When this FPDU is received by the next BFS the tag is extracted from the FPDU header. This then triggers the receiving BFS (now the RS) to issue a first return control token to the AS. This control token instructs the AS to halt the forward transmission of all further data packets intended for a particular destination until further notice. Using the data stored in the OFCT 11 the first return control token follows the same path in reverse that the FPDU followed to reach the RS. This means that the AS will ultimately receive the first return control token on the same flow channel for which further data packet transmission is to be suspended.

The RS then continues to function normally transmitting forward data packets that are received on whichever flow channels are assigned to the data packets. Ultimately, however, no new data packets will be received for the data stream that has been suspended and shortly thereafter the DFC and the AFC for that flow channel will match confirming that acknowledgements have been received for all the data packets transmitted on that flow channel.

Figure 16:
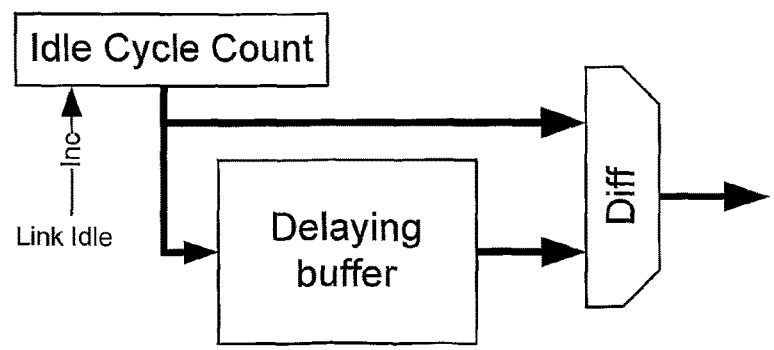
FIG. 16 is a schematic diagram of a link activity monitor for use with the congestion management method of the present invention.

Once the difference between the DFC and the AFC for the relevant flow channel is zero, the RS identifies the least recently used BFSL connected to an input port of the RS as an alternative uncongested link. Selection of an uncongested link can be performed by counting the idle cycles of a network link over a period of time. A simple implementation that provides a rolling uncongested value is shown in FIG. 16. The delay of the idle count through the delaying buffer should be a few times larger than the time it takes to transmit a FPDU. Each input link to a BFS is provided with this mechanism to measure the lack of congestion. Another mechanism is then required to find the network link with the largest uncongested value and this is communicated to all the links that are connected to the BFS. The link with the largest uncongested value becomes the best candidate for accepting a new redirected data stream.

Ideally, the RS performs this check when it first receives an FPDU with a congestion tag so as to verify an input link with a sufficiently large enough uncongested value exists to make it worth sending a token to the relevant AS. The check is then repeated once the DFC and the AFC are equal to identify the alternative link from the AS which is in communication with the uncongested link of the RS.

Once the RS has identified the alternative link from the AS on which future data packets are to be transmitted, this is communicated back, like the suspension token, to the AS using the last acknowledgement. The alternative link or best link token follows the same path in reverse back to the AS. Once the AS receives the best link token and the DFC and the AFC are equal, it is then free to re-start the forward transmission of the suspended data packets but on the alternative link identified by the RS. Thus, when a RS decides it is appropriate to perform a rerouting operation the following actions are performed.

The AS is identified and instructed to stop outputting FPDUs on the old AS output port. This is done by returning a control token that has a parameter that identifies the AS back along the route of the data stream being rerouted The RS then waits for the last acknowledgment as this delays making a decision for the least congested link to signal back to the AS for as long as possible. A later decision is likely to be more valid after the data stream is moved. It then piggybacks the best link number onto the last acknowledgement.

When the AS receives the "best link number" acknowledgment then, provided this is the last acknowledgment, it restarts the data stream onto the new link. The RS may have released the "best link number" acknowledgment before the last PDU had been received at the RS. This means the AS may still have to wait for more acknowledgments before changing the data stream to the new output data port.

If the network is fully loaded with traffic then making a change that moves a data flow is likely to cause new congestion to occur in the early stages of the network. This can be fixed by re-adaptively routing one of the other congested streams but this operation is completely contained in the AS, as will be described below.

A further important feature of the congestion management method described herein is the timing of when rerouting of data streams occurs. An effective implementation of dynamic rerouting relies on a good decision as to when it is appropriate to change a data stream. In some respects it is more important to know when not to change rather than when a change should be made.

With the congestion management method described herein, a feedback mechanism is employed to improve the total throughput of the network. Like all control mechanisms with feedback, the rate of adjustments must be limited to allow a change to take place before another change is attempted. The delay before another adjustment is attempted must be at least equal to the time it takes for a congested data stream to be fully redirected. This delay is signalled on both the link the congestion is being removed from (to prevent another stream being removed before the first has gone) and the delay must be signalled on the link the data stream is being rerouted onto (to prevent the lack of congestion on that link being accounted for twice). There are also occasions when incoming congestion may be ignored, most obviously when outgoing congestion is detected. Ideally, congestion should be solved as close to the destination as possible as this will have the greatest effect on the network as a whole. In particular, if the outgoing congestion is caused by true endpoint congestion (where multiple ingress network ports are trying to send data to a single egress network port) then no dynamic rerouting should be attempted as there is no other route through the network that will relieve this type of congestion. An alternative method for the management of endpoint congestion is the subject of a separate patent application number 0810503.3, the content of which is incorporated herein by reference.

Where the multi-path network includes a mechanism that indicates the age of PDUs from ingress into the network, if there is a choice of congested PDUs arriving from a network link, then it is preferred to redirect an older data stream. This can be done by finding an average age of all PDUs arriving at a BFS and only allowing PDUs that are older than the average to be rerouted.

The present invention described above, can dramatically improve the total bandwidth of any traffic pattern, particularly unchanging random connections which static routing completely fails to deliver any performance. It is especially good at removing the very badly congested connections that often become the critical path for larger applications using the network. Also, it is very responsive to any changes in the network traffic pattern, whilst being unaffected if some of the network traffic is continually changing. It can optimally adjust a network with tens of thousands of ports in just a few tens of microseconds.

The multi-path network described herein is truly scalable offering from 256 ports or fewer up to 48,000 ports or more. A single Ethernet bridge or router using the method and apparatus described herein is capable of providing greatly increased connectivity in comparison to conventional Ethernet bridges. For example, currently the largest 10 Gbe Ethernet bridges (which are modular in construction) offer only 288 ports. With the network of the present invention, a single Ethernet bridge is possible which is capable of operating at 10 Gbe or above and is capable of offering, for example, 48,000 ports.

Although reference has been made herein to an Ethernet bridge or router it will, of course, be apparent that the present invention may be applied to any multi-path network which transports data packets between inputs and outputs to the network. Also, although the multi-path network has been described with respect to full duplex links, the links may alternatively comprise a half duplex link with a sideband to allow acknowledgments tokens and tags to be transmitted in the opposing direction.

Although the present invention has been described with respect to a specific multi-path network, it will, of course, be apparent that the present invention is applicable to any multi-path network which implements dynamic routing, such as adaptive routing. Moreover, the present invention is equally applicable to network topologies other than those illustrated herein involving different numbers of network elements and different degrees and different arrangements of interconnection. Also the present invention is not restricted to a network fabric which uses encapsulation of the data packets during its transit across the network.

Also, although reference has been made herein to the buffers comprising FIFOs it is to be understood that other forms of buffering may be employed which are capable of storing in an ordered manner a plurality of separate data packets.

It is to be understood, therefore, that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A method of managing congestion while transmitting a stream of data packets through a multi-path network having a plurality of network elements arranged in a plurality of switch stages, and having a plurality of network links interconnecting the network elements, the method comprising the steps of:
   Detecting congestion on a network link of the plurality of network links interconnecting an output port of a first network element of the plurality of network elements with a first input port of a second network element of the plurality of network elements, the first network element being in a first switch stage of the plurality of switch stages and the second network element being in a subsequent switch stage of the plurality of switch stages;
   Communicating the detection of congestion from the first network element to the second network element by attaching a congestion tag to the header of a subsequent data packet intended for transmission to the second network element on the congested network link;
   In response to receipt of said subsequent data packet by said second network element, identifying an uncongested network link of the plurality of network links connected to a second input port of said second network element; and
   Determining a new route across the multi-path network which includes the identified uncongested network link and directing future data packets in the stream of data packets along the new route.

2. The method of claim 1, wherein each network element of the plurality of network elements has a plurality of input ports and each input port has associated therewith at least one data packet buffer, the step of detecting congestion including monitoring the content of the data packet buffers of the first network element whereby congestion is detected when the content of a data packet buffer exceeds a predetermined threshold.

3. The method of claim 2, wherein the content of the data packet buffers is monitored by monitoring the depth of the buffers.

4. The method of claim 2, wherein, when the content of a data packet buffer exceeds the predetermined threshold, the congested network link is the network link on which the next data packet to be output from that data packet buffer is intended to be transmitted.

5. The method of claim 1, further comprising, in response to receipt by the second network element of one or more data packets each with a congestion tag in its header, the step of selecting a data packet having a congestion tag in its header and issuing to a third network element in a switch stage preceding the switch stage of the first network element a first control token to prevent the transmission by the third network element of further data packets having the same ordering requirement as the data packet selected by the second network element.

6. The method of claim 5, wherein when a plurality of data packets with congestion tags in their headers and differing ordering requirements are received by the second network element the oldest of the plurality of data packets with congestion tags in their headers is selected and on receipt of the first control token the third network element prevents transmission of further data packets having the same ordering requirement as the selected data packet.

7. The method of claim 5, wherein, in response to the third network element receiving a first control token, the method further comprises the steps of the third network element halting transmission of data packets having the same ordering requirement as the data packet selected by the second network element; and the third network element awaiting instructions for the re-routing of the halted data packets.

8. The method of claim 5, wherein the second network element identifies an uncongested network link after a data packet having a congestion tag in its header has been selected by the second network element.

9. The method of claim 8, wherein the second network element identifies an uncongested network link only after delivery acknowledgements have been received for all data packets having the same ordering requirement as the selected data packet.

10. The method of claim 1, further comprising the step of monitoring the activity of the network links connected to the input ports of the network elements whereby the step of identifying an uncongested network link comprises identifying the least active network link connected to an input port of the second network element.

11. The method of claim 10, wherein the activity of the network links is monitored by counting the number of sequential idle cycles and the least active network link corresponds to the network link having the largest number of sequential idle cycles.

12. The method of claim 9, wherein once the second network element has received delivery acknowledgements for all data packets having the same ordering requirement as the selected data packet, the second network element issues a re-routing instruction to the third network element including information on the uncongested network link that has been identified.

13. The method of claim 12, wherein once the second network element has issued a re-routing instruction to the third network element, the second network element is adapted to prevent issuance of further rerouting instructions in respect of the congested network link for a predetermined period of time.

14. The method of claim 12, wherein once the second network element has issued a re-routing instruction to the third network element, the second network element is adapted to prevent issuance of further re-routing instructions including information on said uncongested network link for a predetermined period of time.

15. The method of claim 12, wherein the third network element does not re-route data packets for which transmission has been halted until delivery acknowledgements are received by the third network element for all previous data packets having the same ordering requirement as the halted data packets.

16. The method of claim 15, wherein the halted data packets are re-routed by the third network element on a different network link selected on the basis of the information on the uncongested network link received from the second network element.

17. The method of claim 1, wherein the first network element continues to transmit data packets on a congested network link even after congestion has been detected on the congested network link.

18. The method of claim 1, wherein when the congestion arises from a congested egress port of the multi-path network, data packets which are intended for the congested egress port are not re-routed.

19. The method of claim 1, wherein each network link is shared by a plurality of individually selectable link channels and wherein one link channel of each network link in the path of a first data packet being transmitted across the network is individually assigned exclusively to subsequent data packets having the same ordering requirement as said first data packet until an acknowledgement of the most recent preceding data packet having the same ordering requirement is transmitted back by an exclusively assigned link.

20. The method of claim 19, wherein the multi-path network includes a plurality of egress ports and wherein a delivery acknowledgement is issued by an egress port when a data packet is received at the egress port, the delivery acknowledgement being transmitted across the network following in reverse the path taken by the data packet being acknowledged, and wherein the state of each link channel in the path taken by the data packet being acknowledged is updated by the acknowledgement.

21. The method of claim 1, wherein when the multi-path network includes at least one degree of symmetry, future data packets are re-routed by a network element in a switch stage symmetric with the switch stage of the second network element.

22. The method of claim 21, wherein the network link selected for transmission of the re-routed data packets is symmetric with the uncongested network link of the second network element.

23. A multi-path network for use in a bridge, switch, router, or hub, the multi-path network comprising a plurality of network ports; a plurality of network elements arranged in a plurality of switch stages; and a plurality of network links interconnecting the network elements and the network ports for transporting a stream of data packets across the multi-path network, each network element having:

At least one congestion detector for detecting congestion on a network link of the plurality of network links connected between an output port of a first network element of the plurality of network elements at a first switch stage of the plurality of switch stages and a first input port of a second network element of the plurality of network elements at a second switch stage of the plurality of switch stages, wherein the congestion detector of the first network element is adapted to communicate the detection of congestion to the second network element by attaching a congestion tag to the header of a next data packet intended for transmission to the second network element on the congested network link to the second network element; and At least one link activity monitor for identifying an uncongested network link of the plurality of network links connected to an alternative input port of the second network element at the second stage, and the network elements being adapted to transport subsequent data packets in the stream of data packets using the uncongested network link.

24. The multi-path network of claim 23, wherein each network element of the plurality of network elements has a plurality of input ports and each input port has associated therewith at least one data packet buffer, the congestion detector being adapted to monitoring the content of the data packet buffers whereby congestion is detected when the content of a data packet buffer exceeds a predetermined threshold.

25. The multi-path network of claim 24, wherein the congestion detector is adapted to monitor the depth of the buffers.

26. The multi-path network of claim 23, wherein, in response to receipt by a network element of a data packet with a congestion tag in its header, each network element is adapted to issue to a third network element in a switch stage of the plurality of switch stages preceding the switch stage of the first network element that detected congestion a first control token to prevent the transmission by the third network element of further data packets having the same ordering requirement as the data packet received by the second network element.

27. The multi-path network of claim 26, wherein, in response to a network element receiving a first control token, each network element is adapted to halt transmission of data packets having the same ordering requirement as the data packet received by the second network element which included a congestion tag in its header and to awaiting instructions for the re-routing of the halted data packets.

28. The multi-path network of claim 23, wherein the link activity monitor is adapted to identify an uncongested network link after a data packet having a congestion tag in its header has been received by the second network element.

29. The multi-path network of claim 28, wherein the link activity monitor is adapted to identify an uncongested network link only after delivery acknowledgements have been received by the second network element for all data packets having the same ordering requirement as the data packet having a congestion tag in its header.

30. The multi-path network of claim 29, wherein the link activity monitor is adapted to identify the least active network link connected to an input port of the network element.

31. The multi-path network of claim 30, wherein the link activity monitor is adapted to count the number of sequential idle cycles of each input port of the network element whereby the least active network link corresponds to the network link having the largest number of sequential idle cycles.

32. The multi-path network of claim 29, wherein the network element is adapted to issue a re-routing instruction to the third network element including information on the uncongested network link that has been identified by the link activity monitor once all delivery acknowledgements for all data packets having the same ordering requirement have been received by the second network element.

33. The multi-path network of claim 27, wherein each network element of the plurality of network elements is adapted not to commence the re-routing of data packets until delivery acknowledgements are received by the second network element for all previous data packets having the same ordering requirement as the halted data packets.

34. The multi-path network of claim 23, wherein the network elements are adapted to continue to transmit data packets on a congested network link even after congestion has been detected on the congested network link.

35. The multi-path network of claim 23, wherein when congestion arises from a congested egress port of the multi-path network, the network elements are adapted not to re-route data packets which are intended for the congested egress port.

36. The multi-path network of claim 23, further including a plurality of egress ports, the egress ports being adapted to issue a delivery acknowledgement when a data packet is received and wherein the network elements are adapted to transmit the delivery acknowledgement across the network following in reverse the path taken by the data packet being acknowledged.

37. The multi-path network of claim 23, wherein the multi-path network includes at least one degree of symmetry and data packets are re-routed by a network element in a switch stage symmetric with the switch stage of the network element that receives the congestion tag.

38. The multi-path network of claim 37, wherein the network link selected for transmission of the re-routed data packets is symmetric with the uncongested network link of the network element that receives the congestion tag.

39. The multi-path network of claim 23, wherein each one of the plurality of network links is a duplex link permitting signals to be transmitted in opposing directions simultaneously.

40. An Ethernet bridge or router comprising:
A multi-path network, wherein the multi-path network comprises a plurality of network ports; a plurality of network elements arranged in a plurality of switch stages; and a plurality of network links interconnecting the network elements and the network ports for transporting a stream of data packets across the multi-path network;
Wherein each network element of the plurality of network elements has at least one congestion detector for detecting congestion on a network link of the plurality of network links connected at an output port thereof, wherein a congestion detector of a first network element at a first switch stage of the plurality of switch stages is configured to detect congestion at an output port thereof which is connected to a first input port of a second network element of the plurality of network elements at a second switch stage of the plurality of switch stages, wherein the congestion detector of the first network element is further adapted to communicate the detection of congestion to a third network element of the plurality of network elements; and
At least one link activity monitor for identifying an uncongested network of the plurality of network links connected to an alternative input port of the second network element at the second switch stage, and the plurality of network elements being adapted to cause the third network element to coordinate the transport of subsequent data packets in the stream of data packets using the uncongested network link, thus allowing the second network element to identify the uncongested network link.

41. The Ethernet bridge or router of claim 40, wherein the congestion detector of the first network element communicates the detection of congestion to the second network element by attaching a congestion tag to the header of a next data packet in the stream of data packets intended for transmission to the second network element on the congested network link.

42. A method of managing congestion in a multi-path network, the network having a plurality of network elements, and a plurality of network links interconnecting the network elements, the method comprising the steps of:
At a first network element of the plurality of network elements within the multi-path network, determining a first data packet route through the multi-path network, and routing data packets across the network using the first data packet route;
At a second network element of the plurality of network elements, detecting congestion on an identified network link of the plurality of network links which is connected to an output port of the second network element, and which forms a part of the first data packet route;
Communicating congestion information concerning the detected congestion on the identified network link to the first network element; and
At the first network element, in response to receipt of said congestion information, determining a second data packet route through the multi-path network which avoids the identified network link, and routing data packets across the network using the second data packet route.

43. The method of claim 42 wherein the second element is in a center portion of the multipath network.

44. The method of claim 42 wherein the first element is a network ingress element of the multipath network.

45. The method of claim 42, wherein each network element of the plurality of network elements has a plurality of input ports and each input port has associated therewith at least one data packet buffer, the step of detecting congestion comprises monitoring the content of the data packet buffers of the second network element whereby congestion is detected when the content of a data packet buffer exceeds a predetermined threshold.

46. The method of claim 45, wherein the content of the data packet buffers is monitored by monitoring the depth of the buffers.

47. The method of claim 45, wherein, when the content of a data packet buffer exceeds the predetermined threshold, the identified congested network link is a network link on which the next data packet to be output from that data packet buffer is intended to be transmitted.

48. The method of claim 42, wherein the identified network link is connected to a third network element of the plurality of network elements, the method further comprising the step of monitoring the activity of the network links connected to the input ports of the plurality of network elements whereby, the step of determining a second data packet route comprises identifying a network link connected to an input port of a third network element which is less active than the identified network link.

49. The method of claim 48, wherein the activity of the network links is monitored by counting the number of sequential idle cycles and the least active network link corresponds to the network link having the largest number of sequential idle cycles.

50. The method of claim 42, wherein when the congestion arises from a congested egress port of the multi-path network, data packets which are intended for the congested egress port are not re-routed.

51. The method of claim 42, wherein each network link is shared by a plurality of individually selectable link channels and wherein one link channel of each network link in the first data packet route is individually assigned exclusively to a first data packet and all subsequent data packets having the same ordering requirement as said first data packet until an acknowledgement of the most recent preceding data packet having the same ordering requirement is transmitted back by an exclusively assigned link.

52. The method of claim 51, wherein the multi-path network includes a plurality of egress ports and wherein a delivery acknowledgement is issued by an egress port when a data packet is received at the egress port, the delivery acknowledgement being transmitted across the network following in reverse the path taken by the data packet being acknowledged, and wherein the state of each link channel in the path taken by the data packet being acknowledged is updated by the acknowledgement.

53. The method of claim 42, wherein when the multi-path network includes at least one degree of symmetry, and wherein future data packets are re-routed by a network element in a switch stage symmetric with the switch stage of the second network element.

54. The method of claim 48, wherein the network link selected for transmission of the re-routed data packets is symmetric with the uncongested network link of the third network element.

* * * * *